United States Patent
Hwang et al.

(10) Patent No.: US 10,530,235 B1
(45) Date of Patent: Jan. 7, 2020

(54) SYSTEMS FOR AND METHODS OF SYNCHRONOUS RECTIFICATION IN A SWITCHING POWER CONVERTER

(71) Applicant: Champion Microelectronic Corporation, Hsinchu (TW)

(72) Inventors: Jeffrey Hwang, Saratoga, CA (US); Alland Chee, Union City, CA (US)

(73) Assignee: Champion Microelectronic Corporation (TW)

( * ) Notice: Subject to any disclaimer, the term of this patent is extended or adjusted under 35 U.S.C. 154(b) by 0 days.

(21) Appl. No.: 16/013,924

(22) Filed: Jun. 20, 2018

(51) Int. Cl.
*H02M 3/335* (2006.01)
*H02M 7/217* (2006.01)
*H02M 1/08* (2006.01)
H02M 1/00 (2006.01)

(52) U.S. Cl.
CPC ......... *H02M 1/08* (2013.01); *H02M 3/33523* (2013.01); *H02M 2001/0048* (2013.01)

(58) Field of Classification Search
CPC ............. H02M 3/335; H02M 3/33507; H02M 3/33523; H02M 3/33569; H02M 3/33576; H02M 3/33592; H02M 7/217
See application file for complete search history.

(56) References Cited

U.S. PATENT DOCUMENTS

| | | | | |
|---|---|---|---|---|
| 6,671,193 B1* | 12/2003 | Pelkonen | ................ | H02M 1/32 361/93.1 |
| 7,408,796 B2* | 8/2008 | Soldano | ............ | H02M 3/33592 363/127 |
| 2004/0245976 A1* | 12/2004 | Koyasu | ..................... | G05F 3/30 323/313 |
| 2007/0103946 A1* | 5/2007 | Kyono | .............. | H02M 3/33592 363/21.14 |
| 2014/0169050 A1* | 6/2014 | Gong | ................ | H02M 3/33592 363/89 |

* cited by examiner

*Primary Examiner* — Gary L Laxton
(74) *Attorney, Agent, or Firm* — Westberg Law Offices

(57) ABSTRACT

Systems for and methods of synchronous rectification in a flyback power converter are disclosed. In accordance with an embodiment, a switching power supply comprises a power converter and a controller. The power converter has an inductor, a capacitor and a switching element. The switching element is configured to rectify a current in the inductor for charging the capacitor to form a voltage for powering a load. The switching element comprises a switch and a diode. The controller is configured to control the switching element and to detect a load condition. When the load condition is detected, the controller controls the switching element to actively rectify the current in the inductor for charging the capacitor. When the load condition is not detected, the controller holds the switching the element open such that the current is passively rectified by the diode.

32 Claims, 5 Drawing Sheets

SYSTEMS FOR AND METHODS OF SYNCHRONOUS RECTIFICATION IN A SWITCHING POWER CONVERTER

BACKGROUND OF THE INVENTION

The present invention relates to the field of switching power supplies. More particularly, the present invention relates to systems for and methods of performing synchronous rectification in a switching power converter.

An off-line switching power supply receives power from an alternating-current (AC) power source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification on the AC signal and maintains current drawn from the AC source substantially in phase with the AC voltage so that the power supply appears as a resistive load to the AC source. The DC-to-DC converter stage receives the output of the PFC stage and generates the voltage-regulated, DC output which can be used to power the load. The output of the PFC stage is typically at higher voltage and is more loosely regulated than the output of the DC-to-DC stage.

A flyback power converter (or, more simply, a flyback converter) can be employed in a DC-to-DC power converter. A flyback converter employs a transformer that transfers energy from the input of the flyback converter to its output and provides electrical isolation between the input and output of the flyback converter as well as voltage multiplication. An input voltage, such as the rectified output voltage of a PFC stage, is applied across the transformer primary winding by closing a switch; as a result, a primary winding current flows and magnetic flux in the transformer increases, storing energy in the transformer. When the switch is opened, the voltage is removed and the primary winding current falls while magnetic flux drops. As a result, a current is induced in a secondary winding of the transformer. This induced current is rectified and used to charge an output capacitor. An output voltage formed across the output capacitor can be used for powering a load.

A diode can be used to rectify the current induced in the secondary winding of the transformer. However, such use of a diode introduces inefficiency due to the non-zero on-resistance of the diode when forward biased.

What are needed are techniques for a switching power supply that improve efficiency. What are further needed are for a switching power supply that improve efficiency under a variety of loading conditions.

SUMMARY OF THE INVENTION

Systems for and methods of synchronous rectification in a flyback power converter are disclosed. In accordance with an embodiment, a switching power supply comprises a power converter and a controller. The power converter has an inductor, a capacitor and a switching element. The switching element is configured to rectify a current in the inductor for charging the capacitor to form a voltage for powering a load. The switching element comprises a switch and a diode. The controller is configured to control the switching element and to detect a load condition. When the load condition is detected, the controller controls the switching element to actively rectify the current in the inductor for charging the capacitor. When the load condition is not detected, the controller holds the switching the element open such that the current is passively rectified by the diode.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
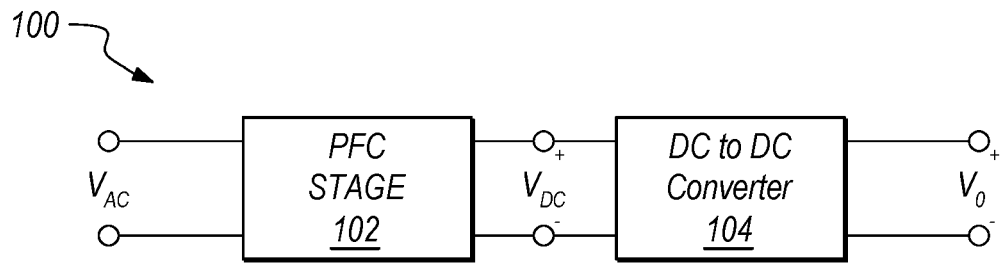
FIG. 1 illustrates a block schematic diagram of a two-stage, off-line power supply in accordance with an embodiment of the present invention.

The present invention is directed toward systems for and methods of performing synchronous rectification in a switching power converter. In accordance with an embodiment, a field-effect transistor is employed to perform synchronous rectification of an inductor current so as to charge a capacitor. A voltage formed across the capacitor can be used to power a load. The voltage formed across the capacitor (also referred to as the "output voltage") can be regulated in a feedback loop. For example, an error signal representative of a difference between the output voltage and a desired level for the output voltage can be used to modulate a switching frequency so as to regulate to the output voltage. In the case of a flyback converter, for example, the inductor current can be a current induced in a secondary winding of a transformer. The present invention can be utilized in conjunction with various switching converter topologies including series resonant converter (SRC), two inductor, one capacitor converter (LLC), and so forth.

Under first loading conditions, rectification of the inductor current is performed passively by a diode. The diode is preferably the body diode of the field-effect transistor. Alternatively, or additionally, the diode can be a discrete diode. In either case, passive rectification is accomplished by maintaining the field-effect transistor in an off (non-conducting state) so that the diode performs rectification. Under second loading conditions, rectification of the inductor current is performed actively by controlling the field-effect transistor so that its switching is synchronous with that of the power converter. This can be accomplished by monitoring a voltage at or near the inductor and comparing the monitored voltage to one or more threshold voltage levels to control turning the transistor on and off at appropriate times during each switching cycle so as to perform synchronous rectification.

The first and second loading conditions refer to an amount of power drawn by a load when the load is coupled to receive the output voltage and is drawing power from the power converter. More particularly, the first loading condition preferably indicates a light load, whereas, the second loading condition preferably indicates a heavy load. Thus, in accordance with an embodiment, under light loading conditions, rectification is performed passively, by a diode, and under heavy loading conditions, rectification is performed actively by synchronously controlling a field effect transistor.

When the output voltage is regulated using frequency modulation, whether the converter is operating under light or heavy load conditions can be determined by monitoring the switching frequency. For example, the switching frequency can be determined by monitoring the switching period. Alternatively, the switching frequency can be determined by monitoring the duration of a portion of the switching period, such as off-time or on-time of a main power switch of the switching converter.

In an embodiment, the loading condition determination is binary, meaning that the load is either "light" or "heavy." For example, a switching frequency below 80 kHz can be designated as indicating a "light" load, whereas, a switching frequency at or above 80 kHz can be designated as indicating a "heavy" load. Alternatively, additional levels of loading can be detected (e.g., "light," "medium," and "heavy"). Further, rather than using the switching frequency to determine the loading condition, another parameter can be monitored, such as the error signal.

In an embodiment, upon determining that the loading has transitioned from light to heavy, the transition from passive rectification to synchronous (i.e. active) rectification is delayed (e.g. by a predetermined time period or a predetermined number of switching cycles). This delay ensures that the loading has transitioned to a steady state heavy load rather than a momentary transition and is intended prevent excessive or unnecessary transitions between passive and synchronous rectification which could interfere with regulating the switching converter output in a feedback loop. The delay can be determined, for example, by counting a number of switching cycles of the power converter or by some other method of determining a time delay such as by using a delay timer. For example, once a transition from light to heavy loading has been detected, then the transition from passive to active rectification may be delayed by a time period, which can be measured as, for example, 65 switching cycles.

In an embodiment, upon determining that the loading has transitioned from heavy to light, the transition from synchronous rectification to passive rectification can occur immediately.

FIG. 1 illustrates a block schematic diagram of a two-stage, off-line power supply 100 in accordance with an embodiment of the present invention. As shown in FIG. 1, a power factor correction (PFC) stage 102 has an input coupled to alternating-current (AC) source. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
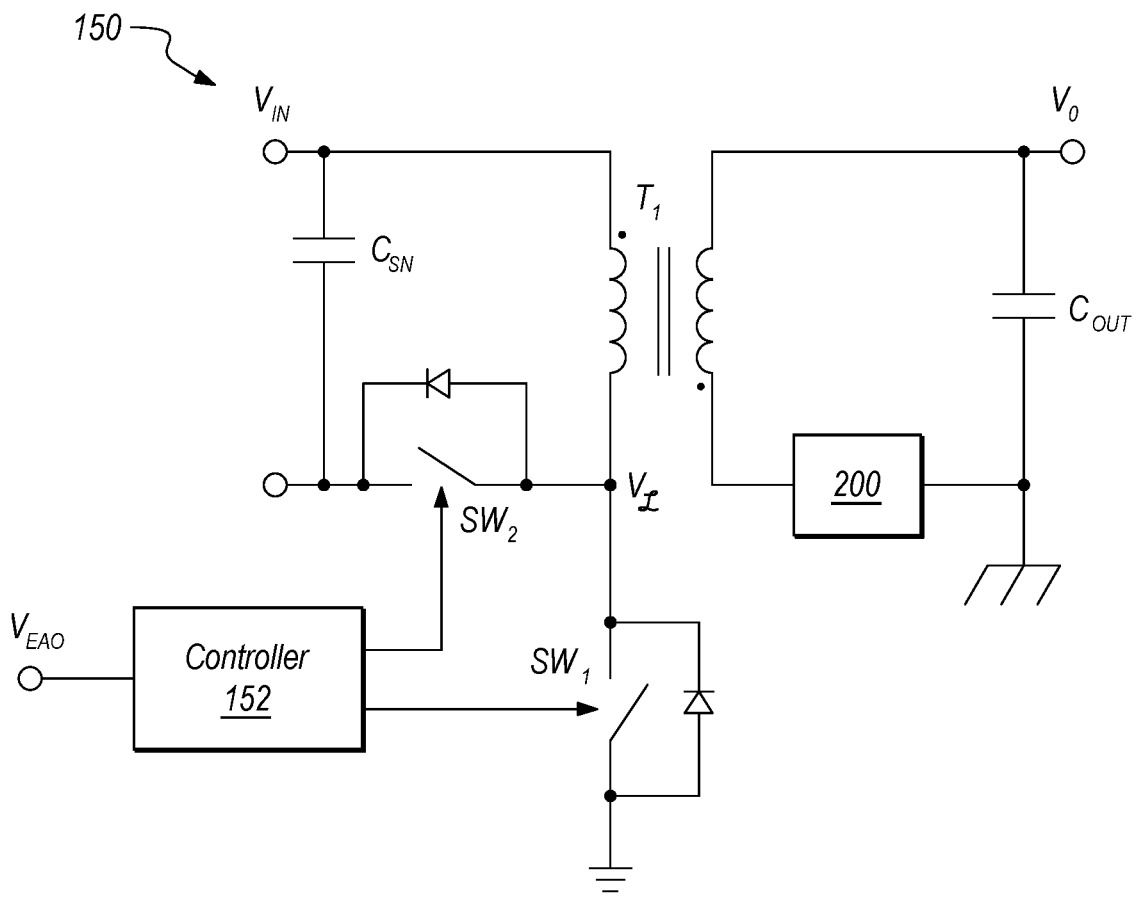
FIG. 2 illustrates a flyback converter suitable for use in a DC-to-DC converter in accordance with an embodiment of the present invention.

FIG. 2 illustrates a flyback converter 150 in accordance with an embodiment of the present invention. The flyback converter is suitable for use in a DC-to-DC converter of a switching power supply, such as the DC-to-DC converter 104 of FIG. 1. The flyback converter 150 receives an input voltage from source $V_{IN}$ that can be a PFC stage output, $V_{DC}$, or that can be received from some other source, such as a rectifier and/or electromagnetic interference (EMI) filter.

As shown in FIG. 2, the input voltage source $V_{IN}$ is coupled to a first terminal of a capacitor $C_{SN}$ and to a first terminal of a primary winding of a transformer $T_1$. The capacitor $C_{SN}$ functions as a snubber capacitor. A second terminal of the primary winding of the transformer $T_1$ is coupled to a first terminal of a switch $SW_1$ ("low side" switch) and to a first terminal of a switch $SW_2$ ("high side" switch). A voltage $V_s$ is formed at a node between the low side switch $SW_1$ and the high side switch $SW_2$ and at the second terminal of the primary winding of the transformer $T_1$. A second terminal of the switch $SW_1$ is coupled to a first ground node. A second terminal of the switch $SW_2$ is coupled to a second terminal of the capacitor $C_{SN}$. The switches $SW_1$ and $SW_2$ (also referred to as "main power" switches since they regulate the amount of power produced by the power converter) can each be implemented as a power MOSFET transistor; thus, a body diode is shown associated with each of switches $SW_1$ and $SW_2$ as shown in FIG. 2. The switch $SW_1$ is controlled by a signal LOWOUT while the switch $SW_2$ is controlled by a signal HIGHOUT. The control signals LOWOUT and HIGHOUT can be generated by a controller 152.

At the secondary winding side of the power converter, a first terminal of a secondary winding of the transformer $T_1$ is coupled to a first terminal of a capacitor $C_{OUT}$. A second terminal of the secondary winding of the transformer T1 is coupled to first terminal of a rectifier 200. A second terminal of the rectifier 200 is coupled to a second terminal of the capacitor $C_{OUT}$ and to a second ground node. The first and second ground nodes are preferably isolated from each other.

The flyback converter 150 is operated by opening and closing the switches $SW_1$ and $SW_2$. The transformer $T_1$ transfers energy from the input of the flyback converter 150 to its output and provides isolation between the input and output of the flyback converter 150. The transformer $T_1$ can also provide voltage multiplication dependent upon its windings ratio. In operation, when the switch $SW_1$ is closed (the switch is turned "ON"), the voltage source $V_{IN}$ is applied across the primary winding of the transformer $T_1$. As a result, a current in the primary winding and a magnetic flux in the transformer $T_1$ increases, which stores energy in the transformer $T_1$. When the switch $SW_1$ is then opened (the switch is turned "OFF"), the current in the primary winding and the magnetic flux drops. As a result, a current is induced in the secondary winding of the transformer $T_1$ that charges the capacitor $C_{OUT}$ with energy to generate an output voltage $V_O$ for powering a load.

When the switch $SW_1$ is opened and the switch $SW_2$ is in the closed position (the switch $SW_2$ is "ON"), the current in the primary winding of the transformer $T_1$ can pass through the high side switch $SW_2$ to the snubber capacitor $C_{SN}$. Alternatively, when the switch $SW_1$ is opened and the switch $SW_2$ is in the open position (the switch $SW_2$ is "OFF"), the current in the primary winding of the transformer $T_1$ can pass through the body diode of the switch $SW_2$. Alternatively, the switch $SW_2$ can be replaced with a diode.

The high side switch $SW_2$ is preferably controlled such that it is open (OFF) when the low side switch $SW_1$ is closed (ON). Then, when the switch $SW_1$ is opened (OFF) and the energy from the transformer $T_1$ has been largely discharged to the output capacitor $C_{OUT}$, the voltage $V_2$ will be equal to $V_{CSN}$. Under these conditions, the switch $SW_2$ is briefly closed (ON). The switch $SW_2$ can thus be operated under zero volt switching (ZVS) conditions. Closing the switch $SW_2$ discharges the level of $V_2$ to that of $V_{IN}$. Then, once $V_2$ is substantially equal to $V_{IN}$, the switch $SW_2$ is opened (OFF). The voltage $V_2$ continues to fall after the switch $SW_2$ is opened, such that when the switch $SW_1$ is closed, the voltage across it is zero or nearly zero. Thus, the switch $SW_1$ ca also be operated under zero volt switching (ZVS) conditions. The cycle then repeats.

The amount of energy transferred to the load can be controlled by adjusting the switching frequency of the switch $SW_1$, adjusting its duty cycle, or both. The switches $SW_1$ and $SW_2$ are also referred to as main power switches since they regulate the amount of power produced by the power converter. Controlling the switching frequency is referred to herein as frequency control or frequency modulation. Alternatively, or additionally, the switching duty cycle of the switch $SW_1$ can be controlled, for example, by controlling peak input current in the transformer. This is referred to as peak current control. As shown in FIG. 2, a feedback or error signal VEAO is provided to the controller 152. This feedback signal allows the switches $SW_1$ and $SW_2$ to be controlled in a feedback loop so as to regulate the output voltage $V_O$. For example, the error signal VEAO can be representative of a difference between the output voltage $V_O$ and a desired level of the output voltage $V_O$. The feedback loop is preferably configured to maintain electrical isolation between the primary and secondary windings of the transformer $T_1$.

The switches $SW_1$ and $SW_2$ can be controlled as described in U.S. patent application Ser. No. 15/615,653, filed on Jun. 6, 2017, and entitled "Power Converter for a Switching Power Supply and Manner of Operation Thereof," the entire contents of which are hereby incorporated by reference.

The rectifier 200 coupled to the transformer $T_1$ secondary winding operates as described in more detail herein. Briefly, the rectifier 200 preferably has two modes of operation. In a first mode, rectification is performed passively, by a diode included within the rectifier 200. In a second, mode, the rectification is performed actively, by a field-effect transistor included within the rectifier 200, which is operated synchronously with the switches $SW_1$ and $SW_2$ (or at least synchronously with the switch $SW_1$). In both modes, the rectification causes the current in the secondary winding of the transformer $T_1$ to charge the capacitor $C_{OUT}$ while preventing discharge of the capacitor $C_{OUT}$ through the transformer $T_1$ (i.e. reverse current is prevented which could cause energy to be reflected back to the primary side of the transformer $T_1$).

As shown in FIG. 2, the rectifier 200 is positioned between the second terminal of the secondary winding of the transformer $T_1$ and the second ground node. Alternatively, the rectifier 200 can be positioned between the first terminal of the secondary winding of the transformer $T_1$ and the first terminal of the capacitor $C_{OUT}$. In this case, the second terminal of the secondary winding of the transformer $T_1$ can be coupled to the second ground node.

Figure 3:
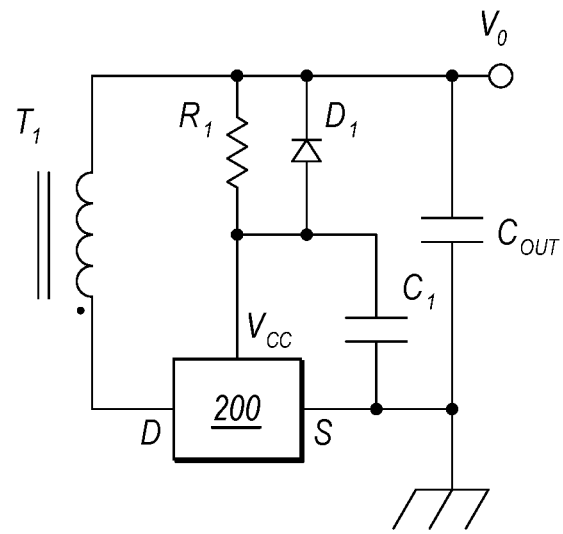
FIG. 3 illustrates a secondary winding portion of a flyback converter having a synchronous rectifier in accordance with an embodiment of the present invention.

FIG. 3 illustrates a secondary winding portion of a flyback converter having a rectifier 200 in accordance with an embodiment of the present invention. FIG. 3 illustrates an embodiment in which the rectifier 200 can be implemented as an integrated circuit (IC) having three terminals: (1) labelled D (for "drain"); (2) labelled S (for "source"); and (3) labelled $V_{CC}$ for connection to a supply voltage $V_{CC}$. Also shown are additional components, including a resistor $R_1$, a capacitor $C_1$ and a diode $D_1$, that assist with generation of the supply voltage $V_{CC}$. A first terminal of the resistor $R_1$ and a cathode of the diode $D_1$ are coupled to the first terminal of the secondary winding of the transformer $T_1$. A second terminal of the resistor $R_1$ and an anode of the diode $D_1$ are coupled to the $V_{CC}$ supply terminal of the rectifier 200 and to a first terminal of a capacitor $C_1$. A second terminal of the capacitor $C_1$ is coupled to the ground node. The capacitor $C_1$ is charged through the resistor $R_1$ by the output voltage $V_O$. The supply voltage $V_{CC}$ is formed across the capacitor $C_1$. The diode $D_1$ prevents the voltage $V_{CC}$ from exceeding the level of $V_O$. The supply voltage $V_{CC}$ provides power to components of the rectifier 200.

Figure 4:
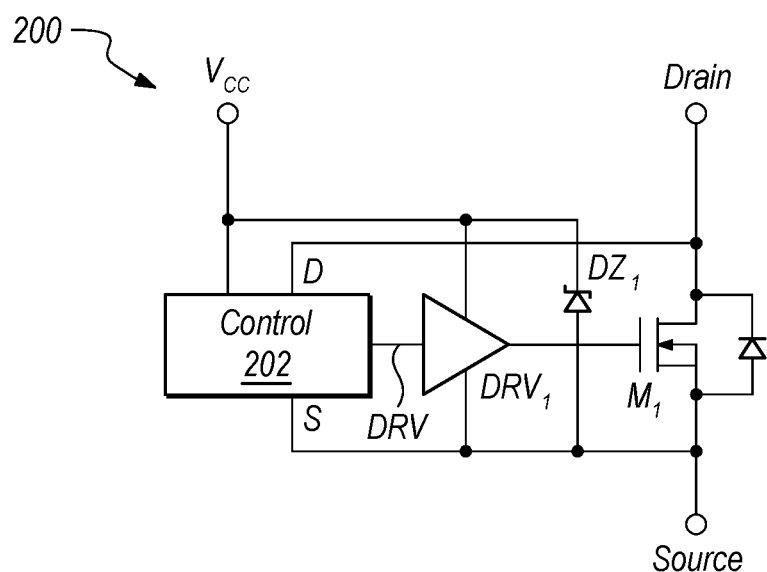
FIG. 4 illustrates a synchronous rectifier in accordance with an embodiment of the present invention.

FIG. 4 illustrates the three-terminal rectifier 200 of FIG. 3 in accordance with an embodiment of the present invention. As shown in FIG. 4, a Zener diode $DZ_1$ is provided with its cathode coupled to the $V_{CC}$ supply terminal and its anode coupled to the source terminal S. The Zener diode $DZ_1$ limits the level of $V_{CC}$ to its reverse breakdown voltage (e.g. 18.5 volts). The drain terminal D is coupled to an input terminal of the control circuitry 202 and to a drain terminal of a field-effect transistor $M_1$ having a body diode. The source terminal S is coupled to the source terminal of the field-effect transistor $M_1$ and to ground terminals of the control circuitry 202 and the driver $DRV_1$. The source terminal S serves as ground node for the rectifier 200. The $V_{CC}$ supply terminal is coupled to provide supply voltage to a control circuitry 202 and to a driver $DRV_1$. An output DRV of the control circuitry 202 is coupled to an input of the driver $DRV_1$. An output of the driver $DRV_1$ is coupled to a gate terminal of the field effect transistor $M_1$. The rectifier 200 of FIG. 4 can be implemented as a three terminal integrated circuit with the terminals being $V_{CC}$, Drain and Source.

The control circuitry 202 controls the field-effect transistor $M_1$ via the driver $DRV_1$. For passive rectification, the field-effect transistor $M_1$ is held off (non-conducting). In this condition, rectification is performed passively by the body diode of the field-effect transistor $M_1$ (or by a discrete diode coupled in parallel with transistor switch and, more particularly, in parallel with the body diode). For active rectification, the control circuitry 202 determines appropriate times during each switching cycle (e.g., the switching cycle of the switches $SW_1$ and $SW_2$ of FIG. 2) for turning the field-effect transistor $M_1$ on and off thereby rectifying the current in the secondary winding of the transformer $T_1$ and preventing reverse current in the secondary winding of the transformer $T_1$.

Figure 5:
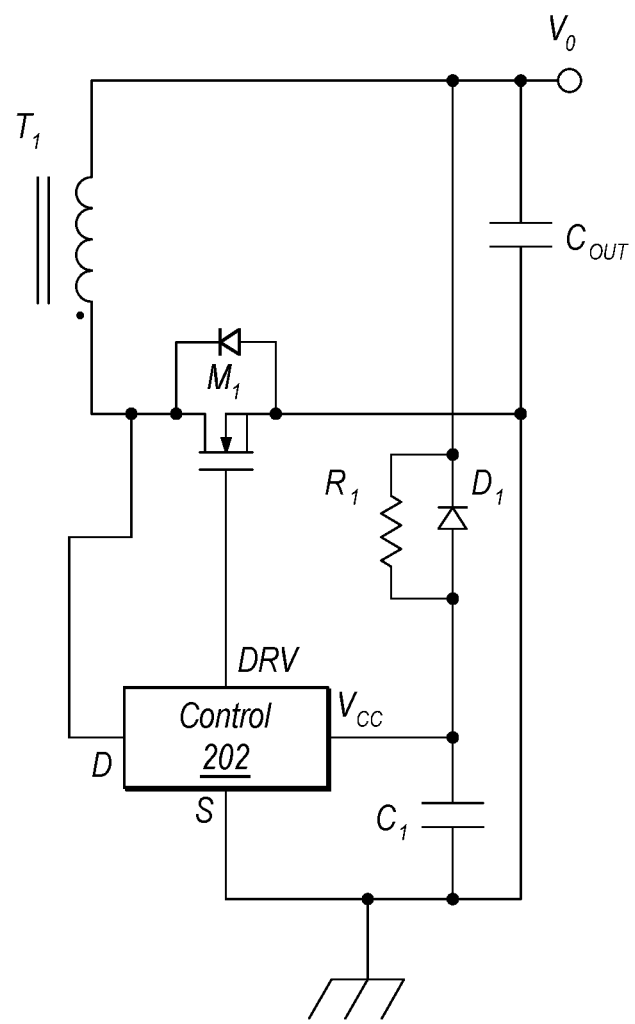
FIG. 5 illustrates a secondary winding portion of a flyback converter having a synchronous rectifier in accordance with an embodiment of the present invention.

FIG. 5 illustrates a secondary winding portion of a flyback converter having a synchronous rectifier in accordance with an embodiment of the present invention. The embodiment of FIG. 5 shows that the control circuitry 202 can be implemented as an IC having four terminals: (1) labelled D (for "drain"); (2) labelled S (for "source"); (3) labelled $V_{CC}$ for connection to a supply voltage $V_{CC}$; and (4) labelled "DRV" for connection to the gate of the field-effect transistor $M_1$. This embodiment differs from that of FIGS. 3 and 4 in that the field-effect transistor $M_1$ is external to the IC and the IC has one additional terminal for controlling the gate of the field-effect transistor $M_1$. In FIG. 4, this additional terminal is not needed as the connection is internal to the rectifier 200.

Figure 6:
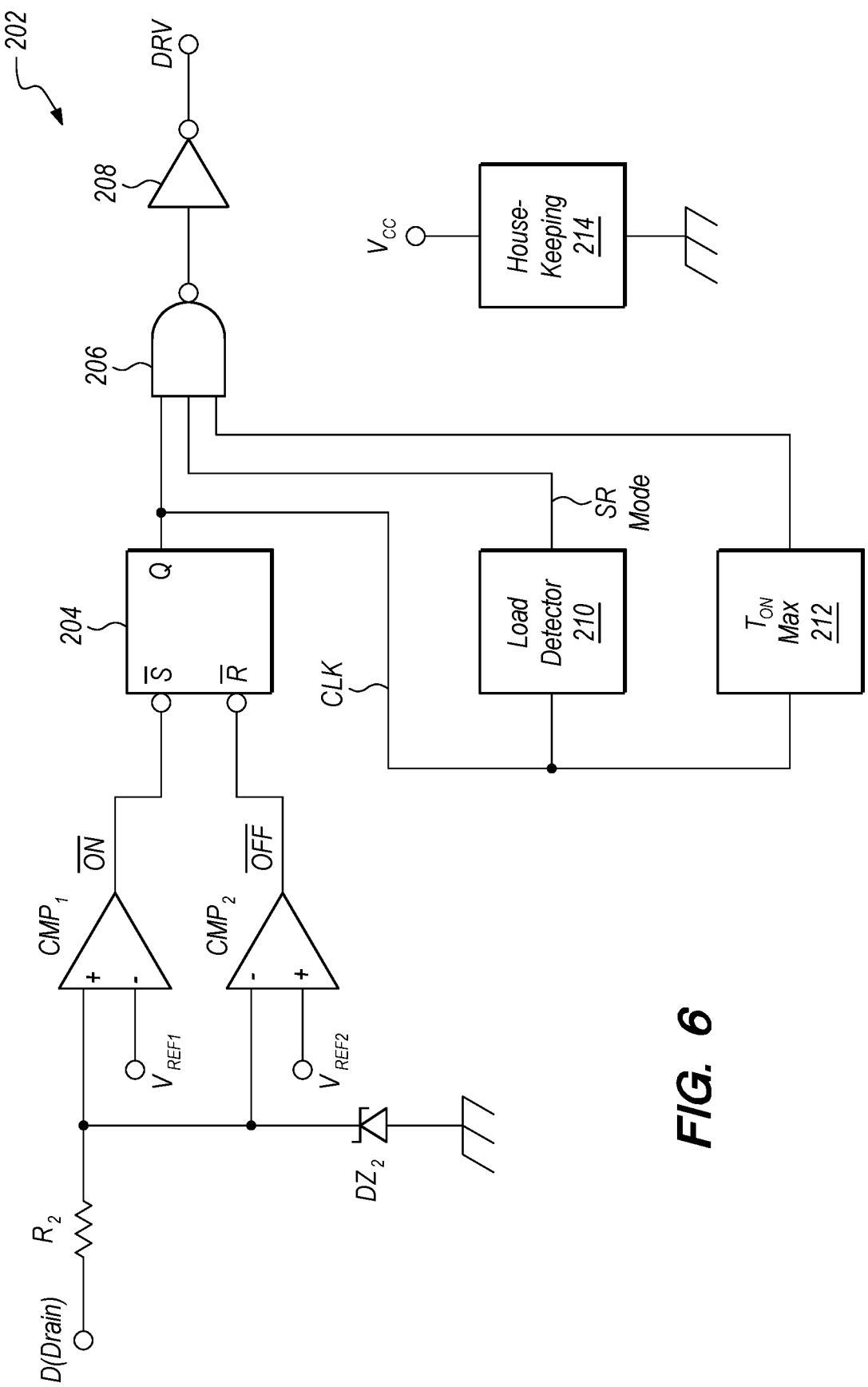
FIG. 6 illustrates controller circuitry for a performing synchronous rectification in accordance with an embodiment of the present invention.

FIG. 6 illustrates controller circuitry 202 for a performing synchronous rectification in accordance with an embodiment of the present invention. Referring to FIG. 6, a drain terminal D is coupled to a first terminal of a resistor $R_2$. A second terminal of the resistor $R_2$ is coupled to a first input terminal of a comparator $CMP_1$, to a first input terminal of a comparator $CMP_2$ and to a cathode of a Zener diode $DZ_2$. An anode of the diode $DZ_2$ is coupled to a ground node. A second terminal of the comparator $CMP_1$ is coupled to first reference voltage $V_{REF1}$. A second terminal of the comparator $CMP_2$ is coupled to second reference voltage $V_{REF2}$. An output of the comparator $CMP_1$ is coupled to an inverted set input to a flip-flop 204. An output of the comparator $CMP_2$ is coupled to an inverted reset input to the flip-flop 204. A non-inverted output of the flip-flip 204 generates a clock signal CLK and is coupled to a first input of a NAND gate 206. An output of the NAND gate 206 is coupled to an input of an inverter/driver 208. An output of the inverter/driver 208 is coupled to the driver terminal DRV.

The signal CLK is derived from a voltage at the transformer $T_1$ and is therefore synchronized with the main power switches $SW_1$ and $SW_2$ (FIG. 2). The signal CLK is coupled to an input of a load detector 210 and to a timer 212. An output of the load detector 210 is coupled to a second input of the NAND gate 206. An output of the timer 212 is coupled to a third input of the NAND gate 210.

The $V_{CC}$ supply terminal is coupled to housing-keeping circuitry 214. The housing-keeping circuitry 214 can be used to generate various house-keeping functions, such as generation of the reference voltages $V_{REF1}$ and $V_{REF2}$.

The comparators $CMP_1$ and $CMP_2$ detect instances when the voltage at the secondary winding of the transformer $T_1$ is rising and falling. Outputs of the comparators are used to control time instances when the transistor $M_1$ is turned off and on for performing synchronous rectification of the current in the secondary winding of the transformer $T_1$ via the flip-flip 204, NAND gate 206 and driver/inverter 208. The reference voltage $V_{REF1}$ can be, for example, set to $-100$ mV, while the reference voltage $V_{REF2}$ can be, for example, set to $-1.0$ mV. In a preferred embodiment, the reference voltages can be precisely controlled, e.g., by laser trimming of resistive elements within the house-keeping circuitry 214 that are used to generate the reference voltages $V_{REF1}$ and $V_{REF2}$.

The clock signal CLK controls the timing of opening and closing the switch $M_1$ of the rectifier 200 and is generated by the flip-flop 204. The clock signal CLK is preferably a logic high voltage when current is flowing in the secondary winding of the transformer $T_1$ and a logic low voltage when current is not flowing in the secondary winding of the transformer $T_1$. The levels of the reference voltages $V_{REF1}$ and $V_{REF2}$ are preferably set so as to achieve synchronous rectification while preventing reverse current in the secondary winding of the transformer $T_1$. Thus, the rising edge of the clock signal CLK may occur slightly after forward current commences in the secondary winding of the transformer T1 while the falling edge of the clock signal CLK may occur slightly before forward current ceases flowing in the secondary winding of the transformer $T_1$.

The load detector 210 is configured to detect a present loading condition of a load coupled to the power converter. More particularly, the clock signal CLK has the same frequency as the switching frequency of the power converter (i.e. the switching frequency of the main power switches $SW_1$ and $SW_2$). The load detector 210 uses this signal to determine the present load condition. The load detector 210 preferably determines whether the load condition is a light load or a heavy load. For example, the load detector 210 can employ timer to determine the period of the clock signal CLK. Alternatively, the load detector 210 can determine the frequency of the clock signal CLK by employing a counter to count switching cycles that occur during a known time period.

In an embodiment employing frequency modulation, a switching frequency below 80 kHz is designated as indicating a "light" load, whereas, a switching frequency at or above 80 kHz is designated as indicating a "heavy" load. Under heavy load conditions, the load detector 210 generates a signal "SR Mode" which enables the output of the flip-flip 204 to control the field-effect transistor $M_1$ to turn off and on at appropriate times to perform rectification of the current in the secondary winding of the transformer $T_1$ synchronously. As shown in FIG. 6, the SR Mode signal enables the NAND gate 206 to pass the CLK signal to the driver 208 under these conditions. Under light load conditions, the signal SR Mode inhibits the output of the flip-flip 204 from controlling the field-effect transistor $M_1$. As shown in FIG. 6, this signal can prevent the NAND gate 206 from passing the CLK signal to the driver 208. Instead, the field-effect transistor $M_1$ is held in an off position so that its body diode performs rectification passively.

In an embodiment, the timer 212 ensures that, under heavy load conditions, the synchronous $M_1$ transistor is positively turned off by a specified instant each switching cycle. Normally, the transistor $M_1$ is turned off at a time during each switching cycle based on the comparator $CMP_2$ detecting the falling level of voltage at the secondary winding of the transformer $T_1$. However, if for some reason, the comparator $CMP_2$ fails to properly detecting this falling level of voltage at the secondary winding of the transformer $T_1$ this could result in the transistor $M_1$ remaining open for the entire switching cycle. Thus, the timer 212 can function as a failsafe to limit the time during each cycle during which the transistor switch $M_1$ remains on. In other words, the timer limits the on-time, $T_{ON}$, for the transistor switch $M_1$. The timer 212 can alternatively be omitted.

Figure 7:
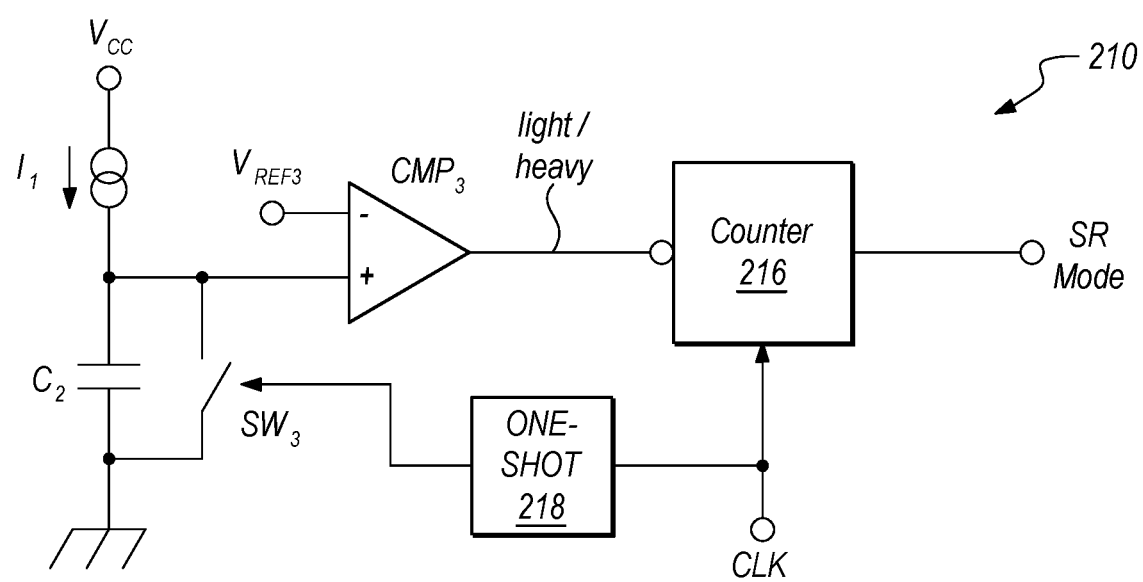
FIG. 7 illustrates load detection circuitry in accordance with an embodiment of the present invention.

FIG. 7 illustrates load detection circuitry 210 in accordance with an embodiment of the present invention. As shown in FIG. 7, the supply voltage $V_{CC}$ is coupled to a first terminal of a current source $I_1$. A second terminal of the current source $I_1$ is coupled to a first input of a comparator $CMP_3$ and to a first terminal of a capacitor $C_2$. A second terminal of the capacitor $C_2$ is coupled to a ground node. A reference voltage $VREF_3$ is coupled to a second input terminal of the comparator $CMP_3$. A switch $SW_3$ is coupled across the capacitor $C_2$. An output of the comparator $CMP_3$ generates a binary signal ("light/heavy") which indicates whether the load condition is presently heavy or light. This signal is coupled to a first input to a counter 216. The clock signal CLK generated by the flip-flop 204 of FIG. 6 is coupled to a second input to the counter 216. The signal SR Mode is generated at an output of the counter 216 and is coupled to the NAND gate 204 of FIG. 6. The clock signal CLK controls the switch $SW_3$. More particularly, the clock signal CLK is coupled to an input to one-shot circuit device 218. An output of the one-shot 218 is coupled to the switch $SW_3$.

In operation, when the switch $SW_3$ is closed, this discharges the capacitor $C_2$. When the switch $SW_3$ is opened, the current source $I_1$ commences charging the capacitor $C_2$ until the switch $SW_3$ is closed again. The switch $SW_3$ is closed once for each switching cycle of the main power switches $SW_1$ and $SW_2$ (FIG. 2). Therefore, the current source $I_1$ and the capacitor $C_2$ function as a timer in which the maximum voltage on the capacitor $C_2$ for each switching cycle represents the amount of time that the switch SW3 remains open and, therefore, this voltage level represents the switching period. The switching period is inversely related to the switching frequency and so this voltage also represents the switching frequency.

When the load is light, the switching period is sufficiently long that the capacitor $C_2$ is charged to the level of $VREF_3$ for each switching period and the output of the comparator $CMP_3$ therefore toggles between a logic low voltage and a logic high voltage. This toggling resets the counter 216 so that the counter 216 is repeatedly reset during light loads. This causes the SR Mode signal at the output of the counter 216 to remain a logic low voltage so that rectification of the current in the secondary winding of the transformer $T_1$ is performed passively.

However, when the load is heavy, the switching period is sufficiently short that the capacitor $C_2$ does not reach the level of the $VREF_3$ before the switch $SW_3$ is closed again for each switching period. The output of the comparator $CMP_3$ therefore remains a logic low voltage. So long as this logic low voltage remains at the output of the comparator CMP3, this causes the counter 216 to count pulses received on the clock signal CLK. Once the count reaches a predetermined value (e.g. a value between 50 and 100, such as 65), then the SR Mode signal output from the counter 216 changes to a logic high voltage which causes active rectification to commence as explained herein. However, if the counter 216 does not reach the predetermined value before the comparator $CMP_3$ detects a light load, then the counter is reset by the comparator $CMP_3$ so that the SR Mode signal remains a logic low voltage and passive rectification continues.

After synchronous rectification commences, if the comparator CMP3 detects a light load, then the counter 216 is reset and the SR Mode signal falls to a logic low voltage. This immediately ceases active rectification so that rectification is then performed passively.

The one-shot 218 generates a brief pulse at the commencement of each switching period. As a result, the voltage on the capacitor C2 for each switching cycle reflects the entire duration of the switching cycle. In other words, the voltage on the capacitor reflects the total of the on-time, $T_{ON}$, and the off-time time, $T_{OFF}$, for the clock signal CLK. In an embodiment, the one-shot 218 can be omitted, which case, the voltage on the capacitor $C_2$ for each switching cycle reflects only the off-time, $T_{OFF}$. Still further, the polarity of the clock signal CLK may be reversed to control the switch $SW_3$, in which case, the voltage on the capacitor $C_2$ for each switching cycle reflects only the on-time, $T_{ON}$. In any event, the off-time, $T_{OFF}$, the on-time, $T_{ON}$, or a combination of the two ($T_{OFF}+T_{ON}$) can be used to detect whether the load is light or heavy.

In an example, when $T_{OFF}$ is greater than 7 uS, this indicates a light load and synchronous rectification is disabled. Then if $T_{OFF}$ falls below 7 uS, this indicates a heavy load and synchronous rectification will commence after waiting 65 switching cycles (if during each of the 65 cycles, $T_{OFF}$ remains below 7 uS; otherwise, synchronous rectification will remain disabled).

In another example, when $T_{ON}$ is greater than 10 uS, this indicates a light load and synchronous rectification is disabled. Then if $T_{ON}$ falls below 10 uS, this indicates a heavy load and synchronous rectification will commence after waiting 65 switching cycles (if during each of the 65 cycles, $T_{ON}$ remains below 10 uS; otherwise, synchronous rectification will remain disabled).

Therefore, the load detector 210 of FIG. 7 functions to detect whether the load is light or heavy. When the load is light, rectification is performed passively. A transition to active rectification is performed only if a heavy load is detected and remains detected for a period of time determined by the counter 216. Once active rectification commences due to a heavy load, if a light load is thereafter detected, rectification returns to passive mode immediately. This one-way delay ensures that the loading has transitioned to a steady state heavy load rather than a momentary transition before active rectification commences. This prevents excessive or unnecessary transitions between passive and synchronous rectification which could interfere with regulating the switching converter output in a feedback loop. Therefore, so long as the voltage on the capacitor $C_2$ indicates a light load, the field-effect transistor $M_1$ is disabled. However, when the voltage on the capacitor $C_2$ indicates a heavy load, the field-effect transistor $M_1$ is enabled to perform synchronous switching after a delay.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
   a power converter having an inductor, a capacitor and a switching element, the switching element configured to rectify a current in the inductor for charging the capacitor to form a voltage for powering a load, wherein the switching element comprises a switch and a diode and the voltage is regulated by controlling a switching frequency; and
   a controller configured to control the switching element and to detect a load condition by monitoring the switching frequency, wherein when the load condition is detected, the controller controls the switching element to actively rectify the current in the inductor for charging the capacitor, and wherein when the load condition is not detected, the controller holds the switching the element open such that the current is passively rectified by the diode.

2. The switching power supply according to claim 1, wherein the switching element comprises a field-effect transistor and the diode comprises a body diode of the field-effect transistor.

3. The switching power supply according to claim 1, wherein the load condition is detected when the switching frequency exceeds a threshold.

4. The switching power supply according to claim 3, wherein when the switching frequency exceeds the threshold, the load condition is heavy.

5. A synchronous rectifier for a switching power supply, the synchronous rectifier comprising:
   a load condition detector configured to detect a load condition of the power supply by monitoring a switching frequency; and
   a synchronous rectification controller configured to control a transistor switch for performing rectification according to the detected load condition, wherein when the load condition is detected, the controller is configured to control the transistor switch to actively rectify a current and wherein when the load condition is not detected, the controller is configured to hold the transistor switch open such that the current is passively rectified by a diode.

6. The synchronous rectifier according to claim 5, wherein the synchronous rectifier is implemented as a three-terminal integrated circuit and includes the transistor switch.

7. The synchronous rectifier according to claim 5, wherein the synchronous rectifier is implemented as a four-terminal integrated circuit and includes a terminal for controlling the transistor switch.

8. The synchronous rectifier according to claim 5, wherein the synchronous rectification controller comprises a first comparator configured to compare an inductor voltage to a first threshold and a second comparator configured to compare the inductor voltage to a second threshold, wherein outputs of the first comparator and the second comparator are used for controlling time instants at which the transistor switch is opened and closed while performing active rectification.

9. The synchronous rectifier according to claim 8, wherein at least one of the first reference voltage and the second reference voltage is adjusted using laser trimming of resistive elements used to generate the reference voltages.

10. The synchronous rectifier according to claim 5, wherein the load detector monitors the switching frequency by measuring an off-time or an on-time of a main power switch of the switching power supply.

11. The synchronous rectifier according to claim 5, wherein the load detector monitors the switching frequency by measuring a switching period of a main power switch of the switching power supply.

12. The synchronous rectifier according to claim 5, wherein the load detector monitors the switching frequency by charging a capacitor with a current source during each switching cycle thereby a voltage on the capacitor is representative of the switching frequency.

13. The synchronous rectifier according to claim 12, wherein the voltage on the capacitor is compared to a reference voltage to detect the load condition.

14. The synchronous rectifier according to claim 5, wherein when the load condition is detected, the controller is configured to commence control of the transistor switch to actively rectify the current after a delay.

15. The synchronous rectifier according to claim 5, wherein when the load condition is no longer detected, the controller is configured to immediately commence holding the transistor switch open.

16. The synchronous rectifier according to claim 5, wherein the diode comprises a body diode of the transistor switch.

17. The synchronous rectifier according to claim 5, wherein the diode comprises a discrete diode in parallel with the transistor switch.

18. The synchronous rectifier according to claim 8, further comprising a timer that limits the time during which the transistor switch is closed in each switching cycle while performing active rectification.

19. The synchronous rectifier according to claim 14, wherein when the load condition is no longer detected, the controller is configured to immediately commence holding the transistor switch open.

20. A synchronous rectification controller for a switching power supply, the controller comprising:
means for detecting a load condition of the power supply by monitoring a switching frequency; and
means for controlling a rectifier according to the detected load condition, wherein when the load condition is detected the controller is configured to control the rectifier to actively rectify a current for charging a capacitor, and wherein when the load condition is not detected the controller is configured to hold the rectifier open such that the current is passively rectified by a diode.

21. The synchronous rectification controller according to claim 20, further comprising means for comparing an inductor voltage to a first threshold and to a second threshold for controlling time instants at which the rectifier is opened and closed while performing active rectification.

22. The synchronous rectification controller according to claim 20, wherein the means for detecting the load condition monitors the switching frequency by monitoring an off-time or an on-time of a main power switch of the power supply.

23. The synchronous rectification controller according to claim 20, wherein the means for detecting the load condition monitors the switching frequency by monitoring a switching period of a main power switch of the power supply.

24. The synchronous rectification controller according to claim 20, wherein the means for detecting the load condition monitors the switching frequency by charging a capacitor with a current source during each switching cycle thereby a voltage on the capacitor is representative of the switching frequency.

25. The synchronous rectification controller according to claim 20, wherein when the load condition is detected the means for controlling the rectifier commences control of the rectifier to actively rectify the current after a delay and wherein when the load condition is no longer detected, the controller is configured to immediately commence holding the rectifier open.

26. A switching power supply comprising:
a flyback power converter comprising: a transformer having a primary winding and a secondary winding; a capacitor; and a field-effect transistor having a body diode, wherein a switched current in the primary winding induces a current in the secondary winding and wherein the field-effect transistor is configured to rectify a current in the secondary winding of the transformer for charging the capacitor to form a voltage for powering a load; and
a controller configured to control the field-effect transistor and to detect a load condition by monitoring a switching frequency in the flyback power converter, wherein when the load condition is detected the controller controls the field-effect transistor to actively rectify the current in the inductor for charging the capacitor, and wherein when the load condition is not detected the controller holds the field-effect transistor element off such that the current is passively rectified by the body diode.

27. A method of performing synchronous rectification comprising steps of:
detecting a load condition of the power supply by monitoring a switching frequency; and
controlling a rectifier according to the detected load condition, wherein when the load condition is detected the controller is configured to control the rectifier to actively rectify a current for charging a capacitor, and wherein when the load condition is not detected the controller is configured to hold the rectifier open such that the current is passively rectified by a diode.

28. The method according to claim 27, further comprising comparing an inductor voltage to a first threshold and to a second threshold for controlling time instants at which the rectifier is opened and closed while performing active rectification.

29. The method according to claim 27, wherein said monitoring the switching frequency is performed by monitoring an off-time or an on-time of a main power switch of the power supply.

30. The method according to claim 27, wherein said monitoring the switching frequency is performed by monitoring a switching period of a main power switch of the power supply.

31. The method according to claim 27, said monitoring the switching frequency is performed by charging a capacitor with a current source during each switching cycle thereby a voltage on the capacitor is representative of the switching frequency.

32. The method according to claim 27, wherein when the load condition is detected, control of the rectifier commences to actively rectify the current after a delay and wherein when the load condition is no longer detected, the rectifier is immediately held open.

* * * * *